Patented Jan. 7, 1941

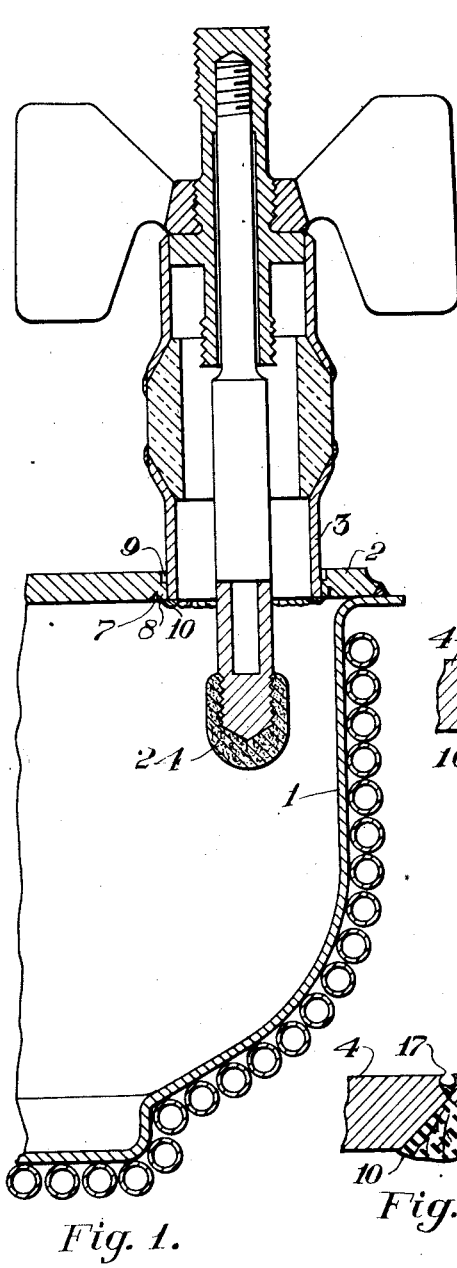
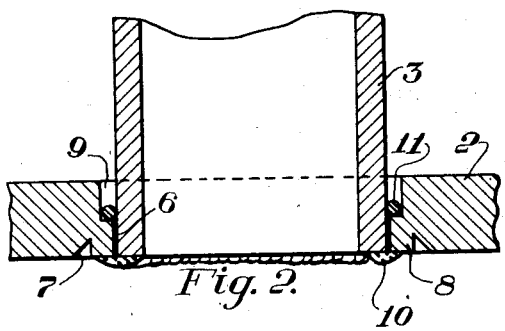
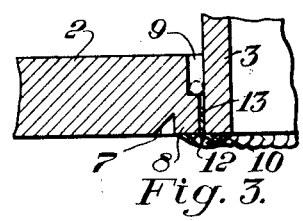
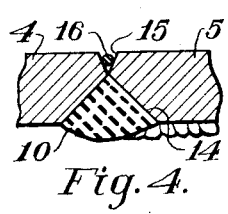
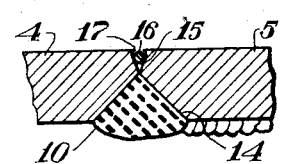
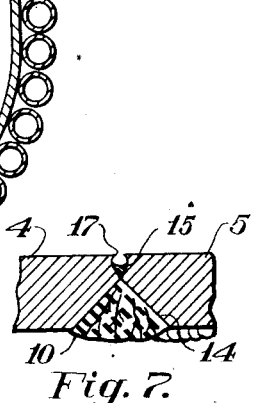
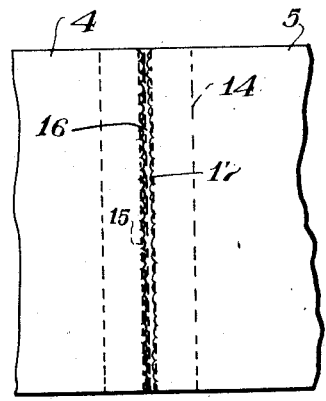
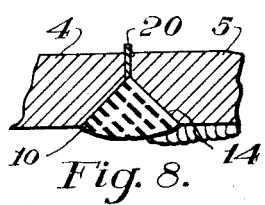

2,228,087

UNITED STATES PATENT OFFICE 2,228,087

VAPOR-ELECTRIC DEVICE AND METHOD OF MAKING THE SAME

Herbert A. Rose, Leonia, N. J., assignor to Westinghouse Electric & Manufacturing Company, East Pittsburgh, Pa., a corporation of Pennsylvania Application October 18, 1938, Serial No. 235,609

4 Claims. (Cl. 29—155.5)

My invention relates to a vapor-electric device, and particularly to a vacuum-proof joint for vacuum vessels for vapor-electric devices.

In the utilization of vapor-electric devices, it is desirable for reasons of economy and convenience, to utilize vacuum vessels capable of maintaining a vacuum for a long period of time without the utilization of evacuating devices. The metal plates of which these vacuum containers are constructed have reached a point of perfection where, to all practical purposes, they are vacuum-tight. However, in fabricating the vessels, it is necessary to secure or join the edges of portions of the materials, and these joints have heretofore been sufficiently porous that except for relatively small sized devices, it has been heretofore impractical to construct non-pumped vacuum devices.

It has heretofore been the practice to construct vacuum vessels by welding the joints with suitable ferrous material or other material unattacked by the mercury vapor, and these welded joints have minute pores or imperfections through which appreciable quantities of gas have heretofore penetrated the vacuum container. It is well known, however, that if sweated joints could be utilized, substantially vacuum-proof joints could be accomplished. However, metals, such as copper, which are utilized in making sweated joints, are readily attacked by mercury vapor so that a sweated joint is impractical for vapor-electric devices.

According to my invention, this difficulty is eliminated by constructing a composite joint. That portion of the joint which is exposed to the deleterious action of the vapor is constructed of a ferrous metal which is substantially unaffected by the vapor while the weld is sealed by sweating in a suitable brazing material, such as copper. This copper not only forms an additional union between the metal parts, but flows into and permeates the minute pores of the welded material so that the weld is substantially vacuum-proof.

It is, accordingly, an object of my invention to provide a vacuum joint capable of maintaining vacuum over long periods of time.

It is a further object of my invention to provide a composite welded and sweated joint.

It is a further object of my invention to provide a method of constructing a joint according to my invention.

Other objects and advantages of my invention will be apparent from the following detailed description, when taken in conjunction with the accompanying drawing, in which:

Figure 1 is a fragmentary sectional elevation of a converter showing one form of my improved joint;

Fig. 2 is a detailed sectional elevation of a welded joint prior to the insertion of the sweating material;

Fig. 3 is a view similar to Fig. 2 showing a complete welded and sweated joint;

Fig. 4 is a section through a seam weld according to my invention;

Fig. 5 is a similar view showing the method of holding the sweat metal in place prior to the sweating operation;

Fig. 6 is a plan view of the seam as shown in Fig. 5;

Fig. 7 is a view similar to Fig. 4 showing a completed joint; and

Fig. 8 is a view similar to Fig. 4 showing a further method of maintaining the sweat metal in position in the joint.

In the preferred embodiment of my invention, the vacuum container for a vapor-electric device is comprised of a plurality of metal sections, one or more of the sections being joined together by longitudinal seams to provide a substantially pot-shaped or cylinder-shaped vessel 1 with a suitable anode plate or so-called cover plate 2. Preferably the cover plate 2, because of its substantially flat form, is relatively thick with respect to the side walls of the vessel. Connected to the vessel proper are suitable entrance bushings 3 for the introduction of the anodes 24 and other necessary auxiliaries. The plate members of which the container 1 is constructed are preferably ferrous metal rolled sheets 4 and 5 of such a nature as to be substantially impervious to gas. These plates 4 and 5 are joined together by the composite weld according to my invention.

To construct this weld the edges of the component parts are brought in proximity to each other and united by any suitable welding method, such as an electric weld or an automatic hydrogen weld. Preferably, I employ, where possible, the so-called deposit weld in which the weld material is deposited from a suitable welding stick. However, it is obvious that if desired, the abutting portions of the metal could be fused to form the weld material.

In connecting the bushing arms 3 to the anode plate 2, the plate 2 is preferably provided with a hole 6 having substantially the same diameter as the external diameter of the bushing arm 3 and the plate 2 is provided with a groove 7 surrounding the inner end opening so as to provide an upstanding lip 8 of substantially the same thickness as the thickness of the arm member 3. Also the opening is enlarged throughout a portion at least to provide a suitable depression 9 for receiving sweat metal such as copper. The inner side of the joint is then welded in a suitable manner to provide a deposited weld 10, after which a strip of sweat metal 11 is inserted in the exterior groove 9 and the whole device raised to a temperature such that the sweat metal 11 is fused and permeates any imperfections or pores 12 in the deposited weld 10. Also, the sweat metal forms an auxiliary union 13 between the metal members 2 and 3.

In order to secure welding of the ferrous metal by the sweat metal, it is necessary to thoroughly clean the surface previous to the insertion of the sweat metal and the heating done under conditions which preclude the formation of slag or oxide at the joint. These conditions may be met by doing the sweating in a vacuum furnace or in a reducing atmosphere such as hydrogen.

In constructing the longitudinal welds between the various metal members 4 and 5, such as those comprising the body of the container, the abutting edges of the metal members are preferably shaped to provide two oppositely directed grooves 14 and 15. That groove 14 which faces inwardly in the container receives a deposit weld 10 in the usual manner, after which that groove 15 facing outwardly is cleaned and filled with a suitable sweat metal such as the copper wire 16.

In the fusing of the copper wire 16, there is a tendency for the copper to flow out, leaving voids or gaps in the finished sweated joint. It is, therefore, desirable to lock the copper in place at least during the preliminary heating steps. This can be accomplished by laying the sweat metal 16 in the groove 15 and deforming the metal adjacent the edge, as by peaning over the edge as shown at 17 in Figs. 5 and 6 to maintain the sweat metal in position.

A further method of maintaining the sweat metal in position is shown in Fig. 8, in which a portion of the abutting edges is butted directly against a suitable strip 20 of sweat metal and the ferrous metal weld 10 is then laid with the sweat metal in position, after which the entire container is raised to a suitable temperature to fuse the sweat metal and produce the permeation of the pores of the ferrous metal weld 10.

While for purposes of illustration I have shown and described specific modifications of my invention, it will be apparent to those skilled in the art that many changes and modifications can be made therein without departing from the true spirit of my invention or the scope of the appended claims.

I claim as my invention:

1. The method of constructing a vacuum-tight joint which comprises positioning abutting edges in position, providing a welding surface on one side of the edges and a depression on the opposite side, uniting the edges by a deposit weld of ferrous material applied to the welding surface, inserting brazing material predominately of copper in the depression and fusing the brazing material to impregnate any faults in the deposit weld.

2. A vacuum tight joint for a ferrous metal container for a vapor-electric device comprising a relatively thick top plate for said container, said top plate having an opening therein, a tubular member extending through and substantially filling said opening, said tubular member being relatively thin with respect to the top plate, said top plate being cut away to provide an upstanding boss on the inner side of the top plate adjacent the tubular member of substantially the same thickness of the tubular member, and an annular depression adjacent the tubular member on the outer side of the top plate, a ferrous seam weld uniting said boss and said tubular member and a filling of copper fused into said depression for sealing flaws in said seam weld.

3. The method of making a vacuum tight joint for a mercury vapor device which comprises abutting the edges of the component parts of said device, providing a welding surface on the inner side of said abutting edges, providing a groove on the outer side of said abutting edges, welding said edges together at said welding surface with a ferrous weld, cleaning the abutting edges, placing a strip of brazing metal predominately of copper in said groove, deforming the edge of the groove to retain the brazing metal in place and fusing the brazing metal in a non-oxidizing atmosphere.

4. The method of constructing a vacuum-tight joint for a ferrous metal vacuum vessel for a mercury-vapor device which comprises providing a top plate for said vessel, said top plate having an opening therein, an extending tubular member through said opening in good fitting relation therewith, said tubular member being relatively thin with respect to the top plate, cutting away a portion of the underside of said top plate to provide a boss adjacent the edge of the opening of substantially the same thickness as the tubular member, cutting away a portion of the outer side of the top plate to provide an annular depression adjacent the tubular member on the outer side of the plate, uniting said tubular member and said boss by a ferrous seam weld and fusing a filling of copper into said depression for sealing the flaws in said seam weld.

HERBERT A. ROSE.